UNITED STATES PATENT OFFICE.

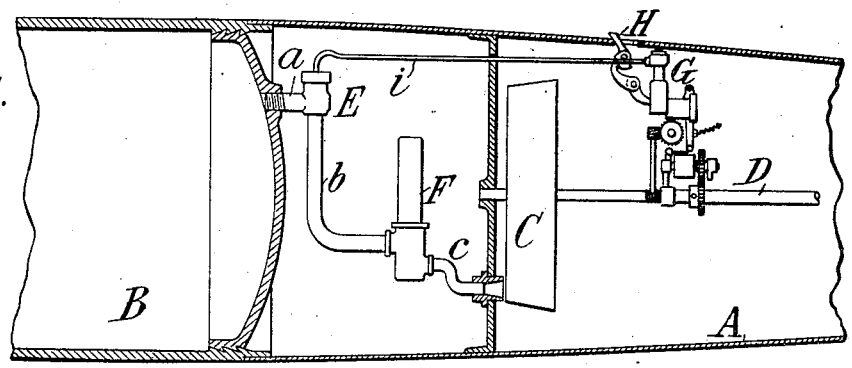
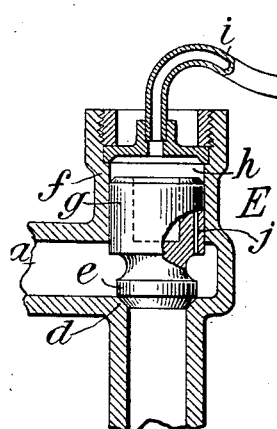
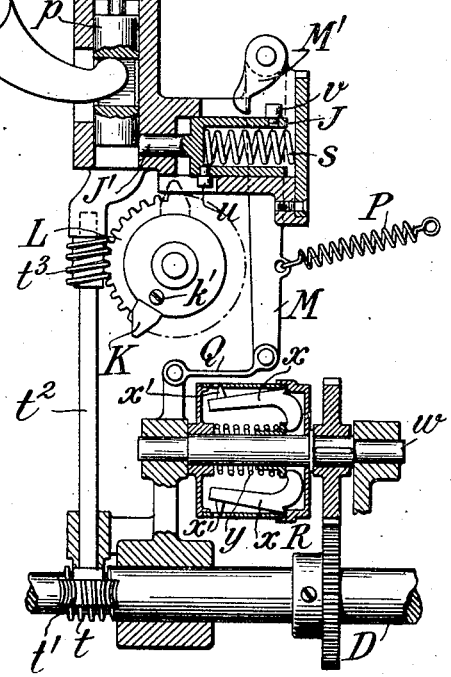
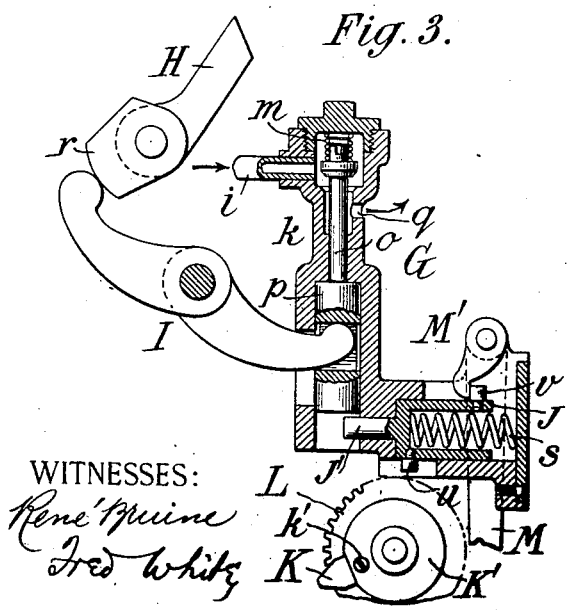
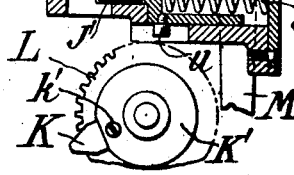

FRANK M. LEAVITT, OF SMITHTOWN, NEW YORK, ASSIGNOR TO E. W. BLISS COMPANY, OF BROOKLYN, NEW YORK, A CORPORATION OF WEST VIRGINIA.

STARTING AND STOPPING MECHANISM FOR AUTOMOBILE TORPEDOES.

1,064,349.

Specification of Letters Patent.

Patented June 10, 1913.

Application filed March 13, 1912. Serial No. 683,446.

*To all whom it may concern:*

Be it known that I, FRANK M. LEAVITT, a citizen of the United States, residing in Smithtown, in the county of Suffolk and State of New York, have invented certain new and useful Improvements in Starting and Stopping Mechanism for Automobile Torpedoes, of which the following is a specification.

This invention provides an improved mechanism applicable to automobile torpedoes for controlling the flow of compressed air or other motive fluid from the reservoir to the motor or engine in order (1) upon the launching of the torpedo to admit the flow of compressed air to the engine; (2) at the end of a predetermined run to shut off the flow of air and thereby stop the engine; and (3) to shut off the air and stop the engine in case at any time during the run the engine, through the existence of any abnormal condition, should attain an abnormal speed exceeding a determined limit of safety. To accomplish these purposes the improved apparatus employs a pressure-controlled starting valve for opening or closing the pipe through which compressed air flows from the reservoir to the engine; for initially opening this valve a controlling valve is provided which is operated by any suitable means acting upon the launching of the torpedo; for closing the starting valve at the end of the determined run a cam device is provided which, after moving a prescribed distance in proportion to a given run of the engine, encounters a part connected with the controlling valve and restores the latter to its original position whereby indirectly the starting valve is closed. As a safety stopping means a centrifugal device is provided, driven from the engine, and which upon the occurrence of an abnormal speed acts to release a spring-pressed part which tends to restore the controlling valve, and which, upon being so released, actuates it to close the starting valve.

In the accompanying drawings which show a suitable embodiment of the invention Figure 1 is a fragmentary vertical section through the middle portion of the hull of a torpedo, the starting and stopping apparatus being shown in elevation. Fig. 2 is a fragmentary view on a larger scale, showing the starting and stopping mechanism in vertical mid-section. Fig. 3 is a part of Fig. 2, showing the parts in a different position.

Referring to Fig. 1, let A designate the hull or shell of the torpedo and B the compressed air reservoir or air flask. C is the motor or engine, in this case shown as a turbine, and D is the propeller shaft driven by such engine. From the reservoir B an outlet pipe *a* leads to the starting valve E, and from the outlet of this valve a pipe *b* leads to a pressure reducing valve F, whence a pipe *c* leads to the nozzle of the turbine. Except for the specific construction of the starting valve E, to be described, all these parts are or may be of the usual construction and arrangement. The starting valve E is a pressure controlled valve controlled by a controlling valve G, which latter is operated at different times by one or another of three instrumentalities (1) the starting means, (2) the normal stopping means for stopping the engine at the end of a normal run, and (3) the abnormal stopping means for stopping the engine in case of over-speeding. The starting valve E comprises a valve shell having a valve seat *d* against which seats a valve proper *e*, and the shell has a cylinder *f* in which moves a piston or plunger *g* connected to the valve proper and of such cross-section as to give an area exceeding that of the valve seat *d*. Above the plunger *g* the space within the cylinder *f* forms a chamber *h* which communicates through a tube *i* with the controlling valve G. The chamber *h* also communicates with the pipe *a* by means of any suitable minute duct leading from above the plunger *g* to beneath the plunger; this duct is most conveniently formed through the plunger itself, being the duct *j*. The controlling valve G is essentially a means for opening or closing communication between the chamber *h* and the atmosphere. In the precise construction shown it comprises a valve shell *k* having a seat against which seats a valve-proper or puppet *l*, which is shown as pressed to its seat by a spring *m* and has a stem *o* passing down through the shell and projecting beneath, where it is engaged by a plunger $p$, the lifting of which lifts the stem and unseats the valve, thereby permitting air to flow out from the tube $i$ to and through a vent orifice $q$. When the puppet $l$ is closed to its seat this outlet is shut off and there is no escape from the chamber $h$, so that the air which leaks into it from the pipe $a$ through the duct $j$ is confined and establishes a pressure in the chamber $h$ equal to that in the pipe $a$. The effect of this pressure is to keep the starting valve E closed, since the pressure in $h$ acts against the entire area of the plunger $g$, whereas the pressure in $a$ acts upwardly against only the difference in area between $g$ and $e$; so that the valve $e$ is pressed to its seat with a force equal to the pressure in $h$ multiplied by the area of the opening through the seat $d$ (the pressure in $b$ being negligible). If now the controlling valve G be opened, the pressure in chamber $h$ may rapidly escape through tube $i$ and orifice $q$; and these being of greater capacity than the leak duct $j$, the pressure rapidly escapes from $h$; as soon as the pressure in $h$ has diminished enough so that the downward pressure upon the plunger $g$ is less than the upward pressure upon the differential area thereof exposed to the undiminished pressure of air in the pipe $a$ (which occurs simultaneously), the plunger is forced upwardly, thereby opening the starting valve E and admitting a flow of air from the reservoir through pipes $a$, $b$ to the reducing valve F, and thence a reduced pressure through the pipe $c$ to the engine, thus starting the engine. While the valve E remains thus open, there is a constant leakage through it to the extent of the air which can blow through the duct $j$, this air constantly escaping through the tube $i$ and orifice $q$. The quantity of air thus lost, however, is so minute as to be unobjectionable. If now the controlling valve G is closed, this escape of air is stopped and the leakage through $j$ quickly builds up a pressure in $h$ which forces the plunger $g$ down and reseats the valve $e$, thus shutting off the flow and stopping the engine.

For initially opening the controlling valve G to start the engine any suitable means may be provided whereby this act shall be performed upon or in consequence of the launching of the torpedo. It is common to provide a torpedo with a starting arm or hook H, which in the act of launching is engaged by a hook or bolt seated in the launching tube so that as the torpedo is pushed outward through the launching tube the stationary hook catches the arm H and throws it over from the position shown in Fig. 2 to that shown in Fig. 3. This movement is utilized to operate the valve G. This may be done as shown through the medium of a cam projection $r$ on the arm H, which acts through a lever I to lift the plunger $p$. Other equivalent means, however, of imparting the movement of the arm H to the valve G may be substituted. Thus, the movement of the starting arm H in the act of launching opens the controlling valve G and this in turn determines the opening of the starting valve E. As the arm H does not remain in the position in which its cam $r$ displaces the lever I, it is necessary, in order to hold the valve G open, to provide a means for continuing the effect of this opening operation. The means provided is in the nature of a detent. A sliding bolt J moves in a suitable housing which is shown as formed in one piece with the shell of the valve G; it is pressed toward the plunger $p$ by a spring $s$, and its active end, preferably a reduced portion J', is arranged so that when the plunger $p$ is lifted it springs under this plunger (see Fig. 3) and holds it up. It remains in this position under the stress of the spring $s$ until the bolt J is drawn back. This retraction of the bolt may be accomplished by the action of either the normal stopping mechanism or the abnormal stopping mechanism.

For accomplishing the normal stopping a cam or projection K is provided mounted on a wheel L, which is driven preferably through a reducing gearing from the engine or propeller shaft. The gearing shown consists of a screw or worm $t$ on the shaft D driving a worm gear $t'$ on a shaft $t^2$ carrying a worm $t^3$ which meshes with peripheral teeth on the wheel L and thereby drives the latter at a rate much slower than that of the propeller shaft. When the engine has run far enough to bring the cam K, from whatever be its starting point to the position shown in dotted lines, it then encounters a projection $u$ on the bolt J, and pressing this back retracts the bolt until its end J' passes out from beneath the plunger $p$, whereupon the latter by its weight, or by the tension of the spring $m$ moves down and permits the closing of the valve G, thus stopping the engine. The cam K must, with any given ratio of gearing, start from a position sufficiently removed from its active position (shown in dotted lines), so that in traversing the intervening space it shall occupy a time equal to the destined run of the engine. If it is desired to vary the time in which the engine is to run before stopping, this may be done either by changing the ratio of the reducing gearing or by initially setting the cam K at a point farther removed from the position at which it becomes active. For the latter purpose the gearing may be disconnected at any suitable point and the wheel L turned to such a position as to bring the cam K to the required starting point; or the cam K may be mounted independently of the wheel, as upon a disk K', and may be turned to bring it to the required starting point and then fastened to the wheel L by any suitable fastening such as a set screw k'.

For accomplishing the abnormal stopping in case of the overspeeding of the engine, a centrifugal device is provided, which when it acts sets in operation a means for retracting the bolt J and thereby closing the controlling valve G. This retracting means consists of a lever M having a short arm M' which, when drawn back, engages a projection v on the bolt to retract it. The lever M is pulled backwardly by a spring P which is strong enough to overcome the resistance of the spring s. The lever is normally held against the pull of this spring P by a link Q which connects the long arm of the lever to a fixed point, and which is severed or disconnected upon the operation of the centrifugal device R. The latter comprises a rotary shell mounted on a shaft w geared to the propeller shaft D, the shell containing centrifugal arms x x which are drawn in by the stress of a spring y and are thrown out centrifugally when the speed becomes so high as to overcome the stress of this spring. The arms x are (or at least one of them is) provided with a spur or cutting edge x', so that when the arms are thrown out by centrifugal force the spur protrudes through an opening in the shell of the centrifugal device and impinges upon the closely adjacent link Q so as to cut this link and thereby release the lever M. When this occurs the spring P pulls the lever over and its arm M' strikes the projection v and pulls back the bolt J, thus releasing the plunger p and permitting the controlling valve G to close. It results that from the overspeeding of the engine this emergency stopping mechanism is tripped, and the controlling valve G insures the closing of the starting valve E, which stops the engine.

The invention may be modified in many respects without departing from its essential features. Certain of the features or elements described may be substituted by mechanical equivalents without materially affecting the operation.

An important feature of the invention is the provision of a detent or equivalent means for holding open the controlling valve after it has been opened mechanically so as to prevent its closing until this detent is withdrawn. Such detent may be variously constructed, the provision of a spring-pressed bolt being deemed the simplest and preferable means. Such detent may be withdrawn by other means than those disclosed, according to how it is desired to cause the stopping of the engine.

The construction of centrifugal device shown is a simple and suitable one, but may be substituted by any of the numerous constructions of centrifugal device such, for example, as those used with engine governors.

I claim as my invention:—

1. In a torpedo, the combination of a starting valve, a controlling valve therefor, means for opening said controlling valve, means for holding said valve open, and means for closing said controlling valve comprising a movable part driven from the engine adapted to withdraw said holding means.

2. In a torpedo, the combination of a pressure-controlled starting valve, a controlling valve therefor, means for opening said controlling valve, a spring-pressed detent moving into the path of a part of said valve for holding it open, and means for closing said valve comprising a movable part driven from the engine adapted to encounter and withdraw said detent.

3. In a torpedo, the combination of a pressure-controlled starting valve, a controlling valve therefor, means for opening said controlling valve, a spring-pressed detent moving into the path of a part of said valve for holding it open, and means for closing it at the end of a determined run of the torpedo, comprising a cam adapted to encounter and withdraw said detent, and gearing for driving said cam from the engine.

4. In a torpedo, the combination of a pressure-controlled starting valve, a controlling valve therefor, means for opening said controlling valve, a spring-pressed detent moving into the path of a part of said valve for holding it open, and means for closing it at the end of a determined run of the torpedo, comprising a movable part adapted to encounter and withdraw said detent, gearing for driving said part from the engine, and means for varying the travel of said part whereby it may be set to move a greater or less time before withdrawing said detent.

5. In a torpedo, the combination of a pressure-controlled starting valve, a controlling valve therefor, means for opening said valve to open the starting valve and start the engine, and means comprising a centrifugal device for closing said controlling valve upon the engine exceeding a prescribed speed.

6. In a torpedo, the combination of a pressure-controlled starting valve, a controlling valve therefor, means for opening said controlling valve, a detent for holding it open, and means for closing it upon the engine exceeding a prescribed speed, comprising a spring-pressed part tending to withdraw the detent, normally held from acting, and a centrifugal device adapted when actuated to release said part and permit the withdrawal of said detent.

7. In a torpedo, the combination of a pressure-controlled starting valve, a controlling valve therefor, means for opening said controlling valve, a detent for holding it open, and means for closing it upon the engine exceeding a prescribed speed, comprising a spring-pressed part tending to withdraw the detent, a frangible part restraining it from acting, and a centrifugal device comprising cutting means for severing said frangible part when a prescribed speed is exceeded.

In witness whereof, I have hereunto signed my name in the presence of two subscribing witnesses.

FRANK M. LEAVITT.

Witnesses:
H. C. SEAMAN,
STEPHEN B. TALLMAN.

---

Copies of this patent may be obtained for five cents each, by addressing the "Commissioner of Patents, Washington, D. C."